Harold L. Lawalin
Kenneth Skirvin
INVENTORS

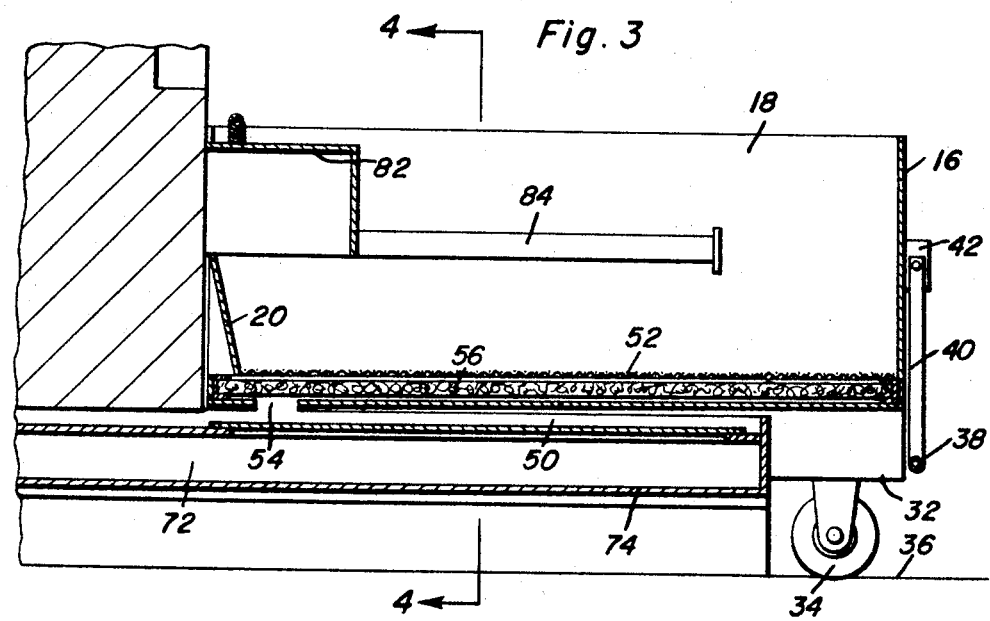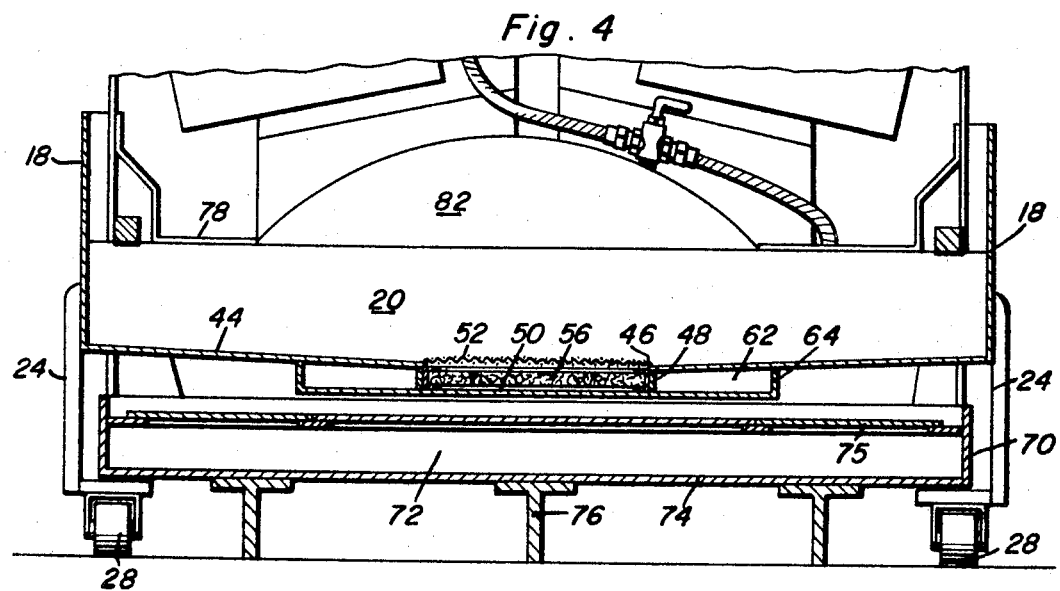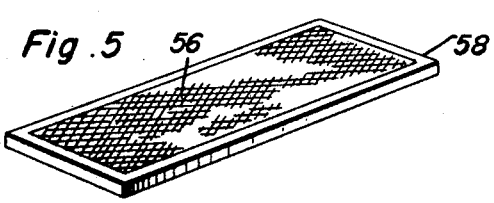

Harold L. Lawalin
Kenneth Skirvin
INVENTORS

United States Patent Office 3,430,767
Patented Mar. 4, 1969

3,430,767
CHIP REMOVING ASSEMBLY
Harold L. Lawalin, 1310 Exeter Ave., Indianapolis, Ind., and Kenneth Skirvin, R.R. 2, Box 72, Greenwood, Ind. 46142
Filed Oct. 8, 1965, Ser. No. 494,176
U.S. Cl. 210—79   7 Claims
Int. Cl. B01d 23/24

ABSTRACT OF THE DISCLOSURE

A mobile and portable chip removing bin for use with a metal working machine including a bottom wall characterized by a central aperture covered with a screen material. A removable filter is positioned underneath the screen and is supported by a plate affixed to the underside of the bin, this plate containing an aperture allowing a fluid coolant to pass through the screen, filter and plate aperture of the bin onto a machine passageway which leads the filtered coolant into a reservoir of the metal working machine. Receiving ways are attached to the underside of the bin at one edge for receipt of the forks of a fork lift truck which transports the bin to a remote destination for emptying the chip contents enclosed therein. To facilitate the dumping of these contents, a bail handle affixed to one end of the bin is positioned on the forks of the fork lift truck thereby permitting a controlled pivoting of the bin during the dumping operation.

---

The present invention generally relates to an assembly for assisting in the removal of chips or cuttings from machines and more particularly relates to a bin that is portable and mobile for association with a metal working machine such as an automatic chucker for receiving the chips and cuttings formed thereby so that the bin may be easily transported to a location where the chips or cuttings may be disposed of.

Heretofore, chip removal from automatic chuckers has been accomplished by hand shoveling and usually requires that a person manually rake chips from the chip container provided as an integral part of the machine. In automatic chuckers, the chip bin or container that is an integral part thereof is no more than a stationary open top container underlying the metal working area of the machine for enabling the chips to fall into the container by gravity. When the container is full or at predetermined intervals, a person shovels the chips from the chip container into a suitable conveyance so that the chips can be transported to an area for disposal. It will be appreciated that this procedure is rather time-consuming and is a laborious job. Further, when the chips are being removed, the machine is stopped thus requiring a considerable down time for the machine during the chip removing operation. Also, the presently employed chip container has a portion of the coolant reservoir forming a portion of the bottom thereof so that the coolant will drain from the chips. Inasmuch as the coolant circulating system has an intake communicated with the coolant reservoir, the coolant circulating system is sometimes stopped or blocked by the chips entrained in the coolant.

Accordingly, it is an object of the present invention to provide a chip container or bin that is a separate unit from the metal working machine or automatic chucker and is located in the same relationship to the automatic chucker as the existing integral bin or container with the assembly of the present invention including a portable and mobile container supported by wheels for ease of orientation in the desired position and provided with a structure enabling a fork lift truck or the like to easily convey the container to a desired point for disposal of the chips together with a structure for enabling the fork lift truck to easily dump the bin or container at the point of disposal.

Another object of the present invention is to provide a chip removal assembly in accordance with the preceding object in which guides or chutes are associated with the automatic chucker to assure proper removal of the chips from the working area into the bin or container.

A further object of the present invention is to provide a chip removal assembly which includes in its bottom a filtering structure overlying a portion of the coolant reservoir to clean the coolant as it is discharged back into the coolant reservoir of the machine.

When using the present invention, substantially all hand labor is eliminated in removing chips from the metal working machine and at the same time eliminates down time of the chip producing machine. Further, the adjacent area is maintained in a clean and neat condition and eliminates unsafe conditions caused by accumulation of chips. This invention will increase the coolant life due to cleaning thereof and eliminates stoppage of the coolant system. Inasmuch as this invention has no moving parts, it will be relatively trouble-free in operation, long-lasting and is quite simple in construction and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a longitudinal, sectional view of the chip removal assembly illustrating the association thereof with the automatic chucker;

FIGURE 4 is a transverse, sectional view taken substantially upon a plane passing along section line 4—4 of FIGURE 3 illustrating further structural details of the assembly;

FIGURE 5 is a perspective view of a filter unit employed in the bottom of the bin or container;

Figure 1:
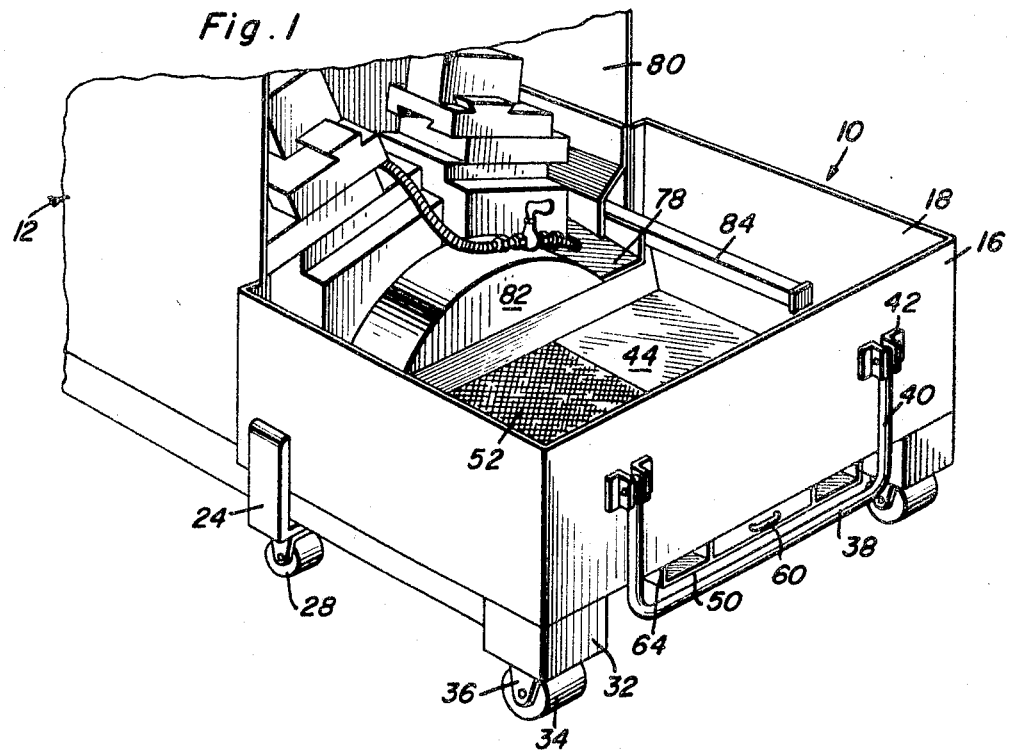
FIGURE 1 is a perspective view of a portion of an automatic chucker illustrating the chip removal assembly associated therewith.

Referring now specifically to the drawings, the chip removal assembly of the present invention generally is designated by the reference numeral 10 and is illustrated diagrammatically in relation to an automatic chucker 12 which is conventional in construction and it is pointed out that the present invention may also be used in combination with other metal working tools or the like which produce metal chips, cuttings or the like during their normal operation.

Figure 2:
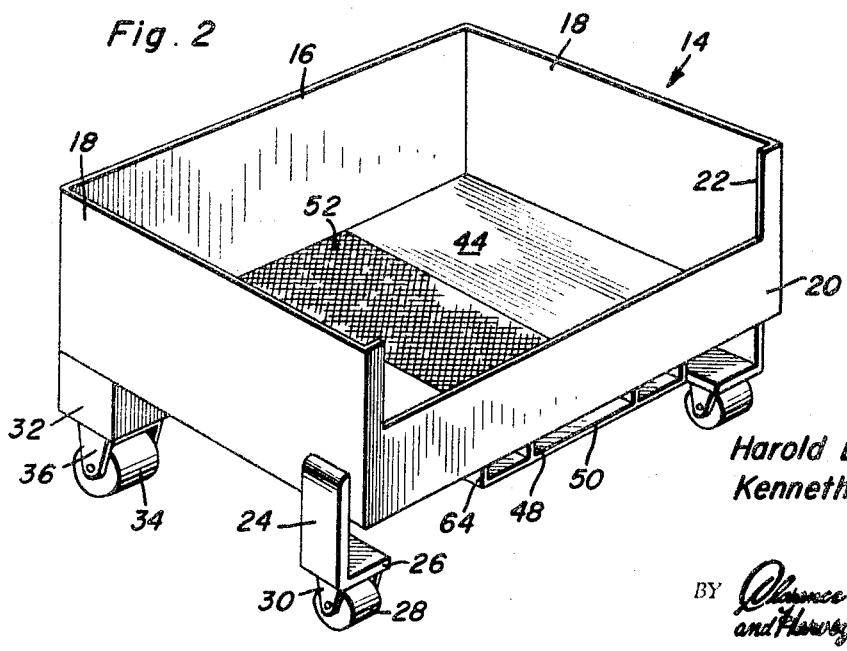
FIGURE 2 is a perspective view of the chip container or bin as viewed from the side thereof disposed against the machine.

FIGURE 2 illustrates a bin or container 14 forming an essential part of the assembly and the bin 14 includes an outer wall 16, side walls 18 and a partial front wall 20 having a notch or cutout area 22 communicating with the top edge thereof and extending to a point adjacent the side walls 18. As illustrated, the walls 16, 18 and 20 are orientated to form generally a rectangular open top bin and it is pointed out that the particular shape and dimensions of the bin 14 may vary depending upon the machine with which it is to be employed.

Adjacent the front corner of the bin, there is a pair of depending support members 24 having an inwardly extending lower end 26 that rotatably supports a wheel or roller 28 thereon by virtue of depending spaced lugs 30. At the rear or outer corners of the bin 14, depending support members 32 are provided and rotatably support wheels or rollers 34 by virtue of spaced depending lugs 36. The support members 32 may be in the form of depending tubular members or any other suitable structural elements for providing support for the wheels 34. Thus, the wheels 28 and 34 serve to support the bin 14 so that it can roll along a floor surface or other supporting surface 36.

For manipulating the bin 14, a generally U-shaped bail or handle 38 is provided which has relatively elongated legs 40 pivotally attached to the outer wall 16 by two pairs of L-shaped lugs 42 thus enabling the handle or bail 38 to be orientated in any desired angular position to form a handle for pulling or pushing the bin and also enable dumping thereof in a convenient manner described hereinafter.

Extending transversely between the peripheral walls of the bin 14 is a bottom wall 44 which slopes toward the center. Between the side walls 18 is forwardly sloping front wall 20 as illustrated in FIGURES 3 and 4 respectively. At the center of the bottom wall 44, there is provided an elongated recess 46 defined by depending flanges 48 that are interconnected by a bottom plate 50 thus forming a longitudinal recess for a filter element 52 which serves to retain the chips while enabling passage of coolant therethrough. At the front or lower end of the bottom plate 50 which is inclined in the same manner as the bottom 44, there is provided a discharge opening 54 for the discharge of coolant liquid back into the coolant reservoir of the machine 12 in a manner described hereinafter. The filter element 52 is in the form of a screen or the like and disposed below the filter element 52 is a removable filter 56 which has a peripheral channel-shaped frame 58 and which is slidable between the flanges 48 and above the bottom plate 50 with the end of the filter element 56 projecting toward the front wall 16 being exposed to the exterior of the bin and provided with a handle 60. Thus, the bottom plate 50 forms a closure for the bottom area of the bin and a flow path for the coolant with the inclination thereof being sufficient that the coolant will flow out of the opening 54 at the forward end of the bottom plate 50. The frame 58 of the filter will serve more or less as a closure for the ends of the recess 46 although any leakage past the front end of the filter will not be detrimental since it will fall by gravity back into the coolant reservoir of the machine 12.

Figure 7:
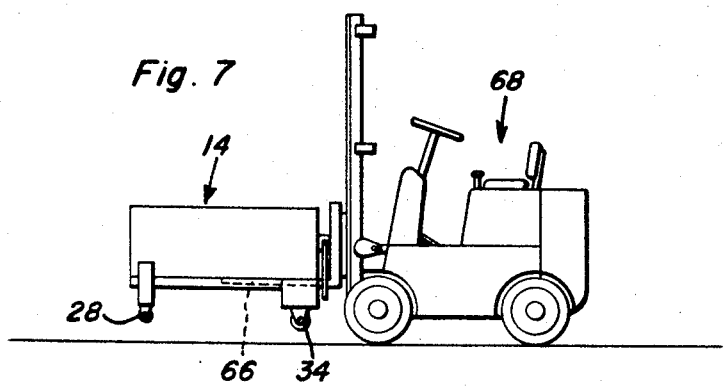
FIGURE 7 is a diagrammatic view illustrating the manner in which a fork lift truck is employed for conveying the bin or container.
Figure 8:
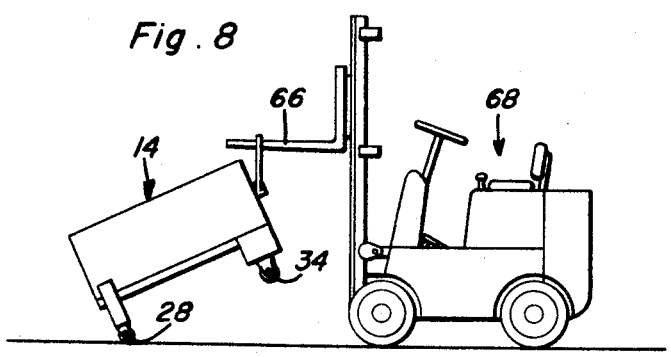
FIGURE 8 is a diagrammatic view similar to FIGURE 7 but illustrating the manner in which the fork lift truck is employed for dumping the chip bin or container.

The bottom plate 50 extends beyond the flanges 48 a distance to form a lift fork receiving recess or way 62. The fork receiving recess 62 is closed at the outer longitudinal edges thereof by flanges 64 which are parallel with the flanges 48 and cooperate therewith together with the bottom plate 50 and the bottom wall 44 to form longitudinal recesses or ways to receive the lift forks 66 of a conventional fork lift truck 68 as illustrated diagrammatically in FIGURE 7 so that the bin 14 may be elevated above the supporting surface and easily conveyed to a point of disposal of the chips. FIGURE 8 illustrates the manner in which the fork lifts 66 of the truck 68 are engaged with the bail 38 to tilt the bin 14 into an inclined position before dumping the chips out of the bin by dumping them over the top edge of the recessed portion of the front wall 20. Thus, the bail or handle 38 may be employed for manipulating the bin 14 in relation to the machine and also for dumping the chips therefrom as illustrated in FIGURE 8.

Figure 6:
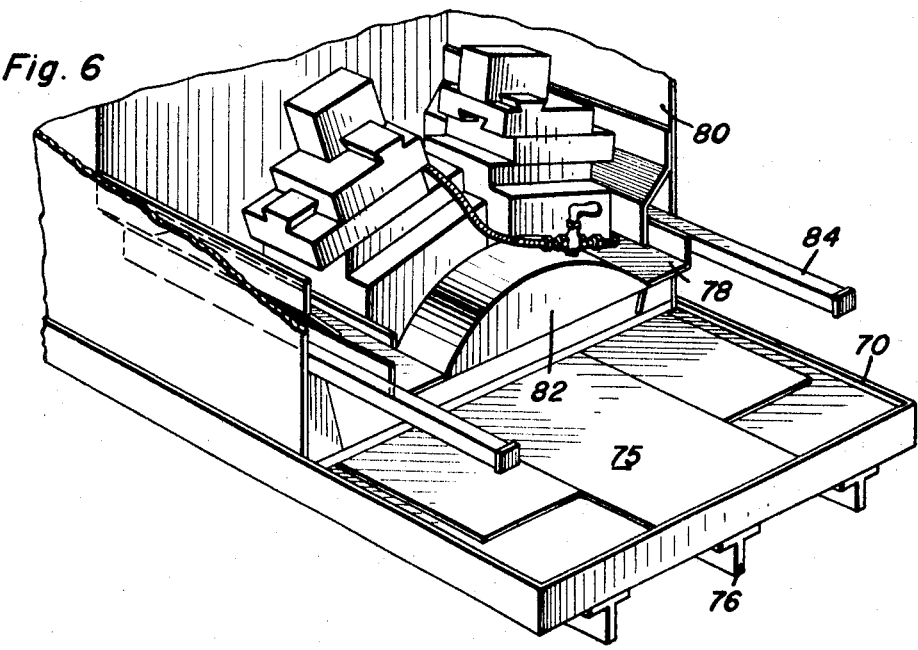
FIGURE 6 is a fragmental perspective view of an automatic chucker illustrating the structure thereof with the chip bin or container of the present invention removed therefrom.

The machine 12 is illustrated diagrammatically and is an automatic chucker. This machine is modified as illustrated in FIGURE 6 in that it normally employs a bin extending upwardly from the partial walls 70 which form a coolant reservoir area 72 inasmuch as there is a continuous bottom 74 supported by support and bracing elements 76. Plates 75 overlie the reservoir 72 to catch chips which may fall toward the reservoir to prevent entry of such chips into the reservoir. A pair of chutes 78 are supported along the side walls 80 of the enclosure for the machine and a shield 82 is also attached to the machine for deflecting chips into the bin. A pair of rails 84 project outwardly from the machine and generally lie alongside the side walls 18 and engage the edges of the recess or cutaway portion 22 of the front wall 20 for serving somewhat as a guide for the bin or container 14. Other than the aforementioned additions, the machine is not modified and the modification of the machine may vary depending upon the type of machine and depending upon the particular orientation and characteristics of the working components of the machine. In some instances, no modification whatsoever of the machine may be made and in other instances, additional chutes or shields may be necessary.

Beginning with a conventional automatic chucker, the chip removing system of the present invention may be incorporated by initial removal of the conventional chip tub from the machine. The chip races or guides 78 are attached and the chip guide or shield 82 is attached for directing or guiding the chips generated into the removable bin 14. The supporting wheels may be casters or any other conventional type of supporting wheel with the casters enabling directional control of the container during movement thereof thus enabling easy removal and insertion of the bin or container. The screen or filter element 52 in the bottom of the bin is fixed above the coolant way or recess 46 and the filter 56 enables return of the clean filtered coolant to the coolant reservoir. Thus, the chips are removed by the fork lift truck picking up the bin and carrying it to a desired location at which time it will be easily dumped. The empty bin may then be transported back to the machine or the filled bin may be removed and an empty bin immediately put in its place so that there will be no down time of the machine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mobile and portable chip removing assembly for metal working machines comprising an open top bin adapted to be positioned in such a manner as to receive chips from a machine, the bottom wall of said bin being disposed in overlying spaced relation with a coolant reservoir of the machine, wheel means on said bin movably supporting the bin from a supporting surface, means on said bin adapted to receive the lifting forks of a fork lift truck for conveying the bin to a location for disposal of chips therein, and means in the bottom of the bin for drainage and discharge of spent coolant therefrom for return of such coolant to said coolant reservoir, said bin including a bottom inclined to direct coolant to a particular area of the bottom, the low point on said bottom having a coolant way incorporated therein, said coolant way including a discharge aperture for discharging coolant and forming the means for returning the coolant to the coolant reservoir.

2. The structure as defined in claim 1 together with a coarse filter element overlying the coolant way for cleaning the coolant during passage of same therethrough.

3. The structure defined in claim 2 together with a removable filter element slidably disposed in said coolant way for additional filtering of the coolant prior to return to the coolant reservoir.

4. The structure as defined in claim 3 wherein said bin is provided with a pivotally supported bail on at least one wall theerof, said bail having a handle forming portion of substantial length, said handle forming portion forming means for manipulating the bin manually and also forming means for engagement by the fork lift members of a fork lift truck for pivoting the bin to a dumping position.

5. The structure as defined in claim 4 wherein the wall portion of said bin opposite to the handle has less vertical height than the remaining wall portions and is inclined slightly inwardly at the bottom thereof for facilitating dumping of the chips from the bin.

6. The structure defined in claim 5 together with chip guide chutes adapted to be supported from the machine and having a discharge point overlying the bin for discharging chips and coolant into the bin.

7. The method of removing chips from a machine consisting of the steps of guiding the chips from the machine into a mobile and portable container, draining spent coolant from the container into a coolant reservoir of the machine and simultaneously filtering the coolant as it is drained back into the coolant reservoir, lifting the container by a lifting and conveying vehicle, replacing the container with an empty container, and conveying the container with chips therein to a point of disposal and thereafter dumping the chips from the container by pivoting the container to a dumping position.

References Cited

UNITED STATES PATENTS

| | | | |
|---|---|---|---|
| 535,216 | 3/1895 | Marsh | 210—477 X |
| 893,177 | 7/1908 | Long | 210—482 |
| 2,215,607 | 9/1940 | Eastwood | 210—465 |
| 2,765,916 | 10/1956 | Montgomery et al. | 210—171 X |
| 2,909,285 | 10/1959 | Besler | 210—236 X |
| 3,091,339 | 5/1963 | Marra et al. | 210—482 X |
| 1,454,710 | 5/1923 | Drinkwater | 108—51 X |
| 2,808,157 | 10/1957 | Terrill | 108—52 X |
| 3,227,108 | 1/1966 | Greaves | 108—53 |
| 3,233,564 | 2/1966 | Sullivan | 108—58 |

FOREIGN PATENTS

| | | |
|---|---|---|
| 98,315 | 12/1896 | Germany. |
| 444,713 | 7/1949 | Italy. |
| 701,521 | 1/1965 | Canada. |

SAMIH N. ZAHARNA, *Primary Examiner.*

JOHN ADEE, *Assistant Examiner.*

U.S. Cl. X.R.

210—167, 241, 407, 471